United States Patent [19]

Kaneko et al.

[11] Patent Number: 4,727,423

[45] Date of Patent: Feb. 23, 1988

[54] VIDEO DATA PROCESSING CIRCUIT EMPLOYING PLURAL PARALLEL-TO-SERIAL CONVERTERS AND LOOK-UP TABLES

[75] Inventors: Kohichi Kaneko; Satio Suzuki; Yasuhito Kawakita, all of Hamamatsu, Japan

[73] Assignee: Nippon Gakki Seizo Kabushiki Kaisha, Hamamatsu, Japan

[21] Appl. No.: 885,926

[22] Filed: Jul. 15, 1986

[30] Foreign Application Priority Data

Jul. 19, 1985 [JP] Japan ............................... 60-159980

[51] Int. Cl.[4] ......................... H04N 5/14; H04N 9/64

[52] U.S. Cl. ................................ 358/160; 358/21 R; 358/280; 364/518

[58] Field of Search ..................... 358/160, 21 R, 903, 358/166, 37, 280, 284; 364/514, 518, 521, 522

[56] References Cited

U.S. PATENT DOCUMENTS

| | | | |
|---|---|---|---|
| 4,384,336 | 5/1983 | Frankle | 358/160 |
| 4,437,121 | 3/1984 | Taylor | 358/160 |
| 4,587,558 | 5/1986 | Sugiyama | 358/160 |
| 4,616,319 | 10/1986 | Peters | 358/903 |

*Primary Examiner*—Tommy P. Chin

*Attorney, Agent, or Firm*—Spensley Horn Jubas & Lubitz

[57] ABSTRACT

A video data processing circuit eanbles an image to be displayed at a higher resolution on an image display unit such as a CRT display unit without the need for high speed parallel-to-serial (P/S) conversion and high speed accessing to look-up tables. Video data each composed of k bits are read in parallel from first to ith video RAMs (VRAMs) and supplied to a corresponding one of first to jth P/S converters. Each of the first to jth P/S converters parallelly stores those k bit video data. Each of the P/S converters serially outputs the stored video data one by one at a first time interval. The video data from the first P/S converters are supplied to a first look-up table, and similarly the video data from the second P/S converters to jth converters are supplied respectively to second to jth look-up tables. Each of the first to jth look-up tables convert the supplied video data into color data. The color data outputted respectively from the first to jth look-up tables are supplied to a selector which outputs the supplied color data one by one at a second time interval of one jth of the first time interval.

8 Claims, 5 Drawing Figures

VIDEO DATA PROCESSING CIRCUIT EMPLOYING PLURAL PARALLEL-TO-SERIAL CONVERTERS AND LOOK-UP TABLES

BACKGROUND OF THE INVENTION

1. Field of the Invention

This invention relates to a video data processing circuit for use with an image display unit such as a CRT display unit for displaying an image on the image display unit in accordance with video data stored in a video memory (or a refresh buffer).

2. Prior Art

In an ordinary image display system, display of image is effected on a CRT display screen based on video data sequentially read from a video memory. And therefore, to enhance the resolution of displayed images, such image display system requires a video memory of a large storage capacity and video data must be read therefrom at a higher speed or rate. When it is required to effect color display of the image, the storage capacity of the video memory and the speed of reading of the data from the video memory must be further increased. On the other hand, to increase the number of colors used in the color display, the amount of video data must also be increased, and therefore a video data processing circuit capable of reading the video data from the video memory at a very high speed is necessary.

FIG. 1 shows one conventional data processing circuit for an image display system which is so designed as to read video data from a video memory at a high speed. This video data processing circuit is so arranged that an image composed of 1024×800 pixels (or dots) is displayed on a CRT display screen by a non-interlaced scanning at a frequency of 60 Hz, the time required to display one pixel being 15.7 nsec.

In FIG. 1, shown at 1 to 4 are video RAMs (hereinafter referred to as "VRAM") each comprising sixteen RAM chips of 64K address by one bit organization. More specifically, the VRAM 1 comprises RAMs $1_1$ to $1_{16}$, the VRAM 2 comprises RAMs $2_1$ to $2_{16}$, the VRAM 3 comprises RAMs $3_1$ to $3_{16}$, and the VRAM 4 comprises RAMs $4_1$ to $4_{16}$. Each of the RAMs are assigned the same addresses, so that a 16-bit data is readout from each of the VRAMs 1 to 4 by one access thereto.

The four groups of 16-bit data read from the VRAMs 1 to 4 are supplied in parallel to parallel-to-serial converters (P/S converter) 5 to 8, respectively. Each of the P/S converters 5 to 8 converts the supplied 16-bit data into a serial data, and supplies the serial data bit by bit at a time interval of 15.7 nsec to a look-up table 10, the bits outputted simultaneously from the P/S converters 5 to 8 form 4-bit video data for one pixel. The look-up table 10 comprises a RAM (not shown) and converts each of the 4-bit data (video data) supplied from the P/S converters 5 to 8 into color data composed of red, green and blue data based on conversion data stored in the RAM. The conversion data provided in the look-up table 10 can be changed by a central processing unit (CPU) 11. The look-up table 10 performs the conversion operation (or the readout operation) at a time interval of 15.7 nsec. The number of bits (n) of the color data outputted from the look-up table 10 is generally greater than the number of bits (m) of the video data inputted thereto, and therefore the look-up table 10 can be arranged so that one of $2^m$ colors is selected from $2^n$ colors. In the case of the system of FIG. 1, "m" is equal to four, and therefore, one of sixteen colors can be selected from $2^n$ colors. Thus, the number of selectable colors can be increased by augmenting the number of VRAMs.

The color data outputted from the look-up table 10 is supplied to a digital-to-analog converter (DAC) 12 which converts the red, green and blue data contained in each color data into analog red, green and blue signals R, G and B, respectively. These analog signals R, G and B are supplied to a CRT display unit 13, whereby a color image is displayed on a screen thereof.

In the above-described conventional system, the shift operation effected by the P/S converters 5 to 8 and the readout operation effected in the look-up table 10 must be synchronized with the display operation or scanning of the CRT display unit 13. More specifically, the shift operation of the P/S converters 5 to 8 and the readout operation of the look-up table 10 must be effected at a time interval of 15.7 nsec which corresponds to a time period required to display one pixel on the screen of the CRT display unit 13 (i.e., a dot display period). Thus, to enhance the resolution of images displayed on the CRT display unit 13, the speed of operation of the P/S converters 5 to 8 and the look-up table 10 must be increased quite a lot, which is, however, is very difficult.

SUMMARY OF THE INVENTION

It is therefore an object of the present invention to provide a video data processing circuit for use with an image display unit which can display an image on the image display unit at a higher resolution without the need for high speed circuit devices such as a high speed parallel-to-serial converters and RAMs.

According to an aspect of the present invention, there is provided a video data processing circuit for use with an image display unit for displaying an image on a display area of the image display unit in accordance with video data which are respectively representative of pixels constituting the display area comprising first to ith memory means having the same addresses for storing the video data and for being simultaneously accessed to output at a time i pieces of data from among the stored video data; first to jth parallel-to-serial converting means provided correspondingly to the first to ith memory means, each of the first to jth parallel-to-serial converting means for storing corresponding ones from among the i pieces of data and then for serially outputting the corresponding ones at a first predetermined interval; first to jth look-up table means provided correspondingly to the first to jth parallel-to-serial converting means, the kth ($1 \leqq k \leqq j$) look-up table means being responsive to the corresponding ones outputted from the kth parallel-to-serial converting means and successively converting the received ones into image data; and selector means for being supplied with the image data respectively from the first to jth look-up table means and outputting the supplied image data one by one at a second predetermined time interval of which length is equal to one jth of that of the first predetermined time interval, the image being displayed on the image display unit in accordance with the image data outputted from the selector means.

DESCRIPTION OF THE PREFERRED EMBODIMENTS OF THE INVENTION

Figure 1:
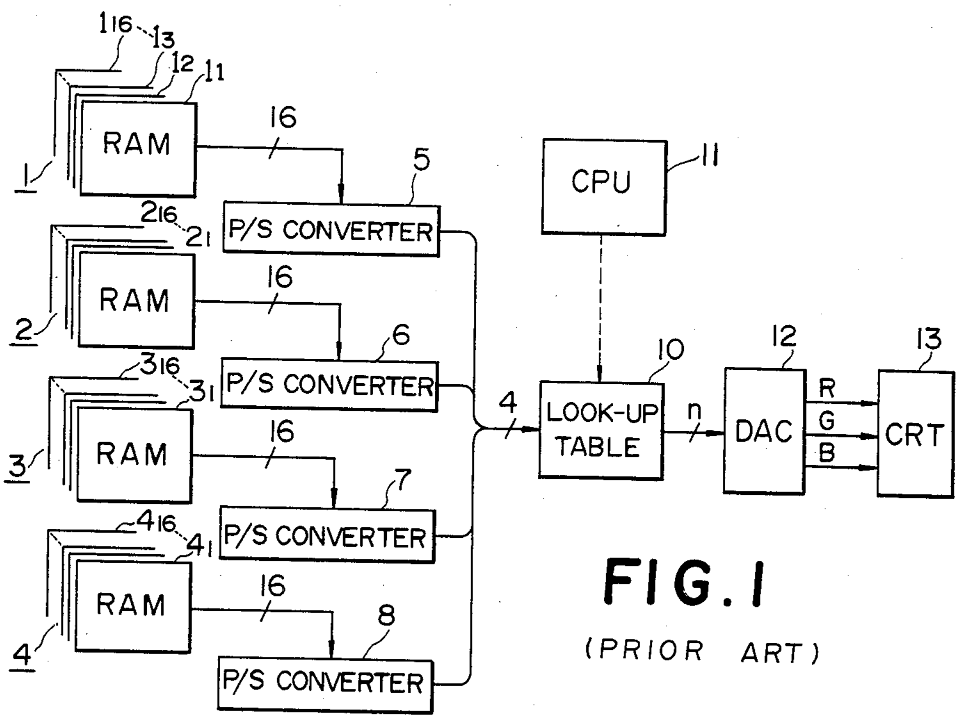
FIG. 1 (PRIOR ART)
FIG. 1 is a block diagram of one conventional video data processing circuit for an image display system.
Figure 3:
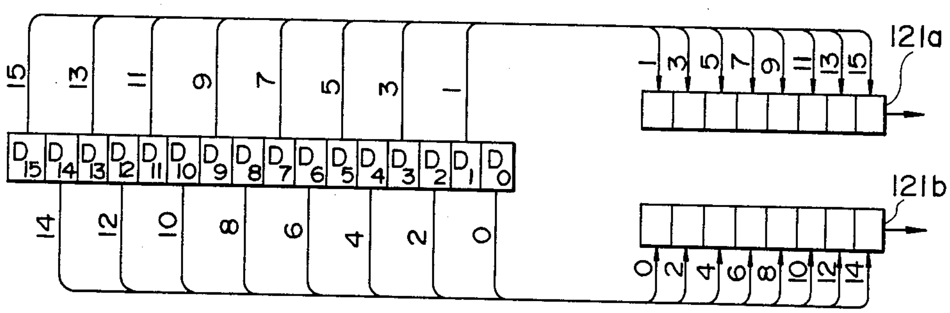
FIG. 3 is an illustration showing the relationship between the data read from the VRAMs 101 and the P/S converters 121*a* and 121*b* of the video data processing circuit of FIG. 2.
Figure 2:
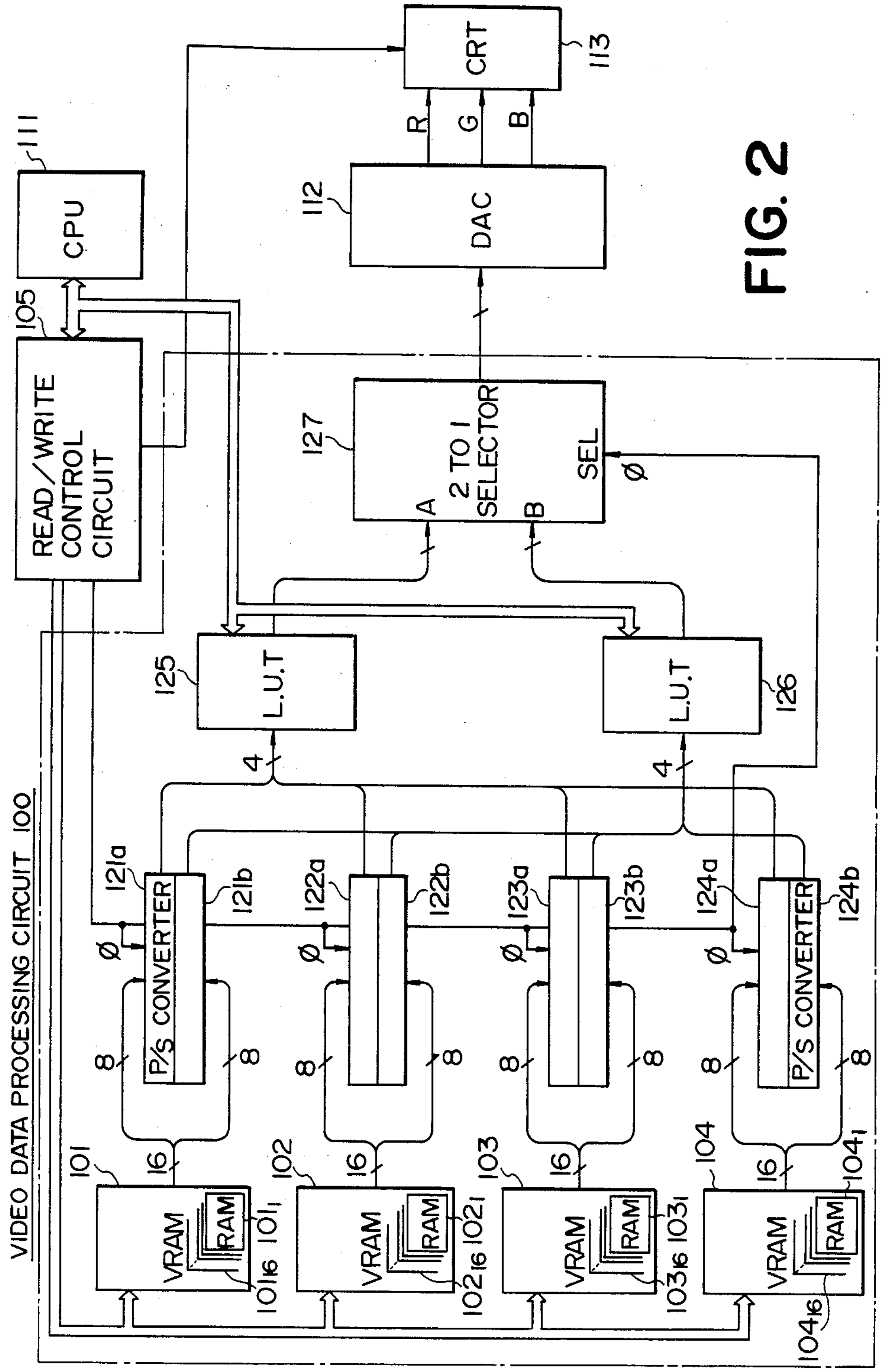
FIG. 2 is a block diagram of a video data processing circuit provided in accordance with the present invention.

Referring now to FIG. 2, there is shown an image display system comprising a video data processing circuit 100 characterizing the present invention. The image data display system is so designed that an image composed of 1024×800 pixels is displayed on a CRT display screen by a non-interlaced scanning at a frequency of 60 Hz, the time period required to display one pixel being 15.7 nsec. The video data processing circuit 100 comprises four VRAMs 101 to 104 each of which comprises sixteen RAM chips of 64K address by one bit organization. More specifically, the VRAM 101 comprises RAMs $\mathbf{101}_1$ to $\mathbf{101}_{16}$, the VRAM 102 comprises RAMs $\mathbf{102}_1$ to $\mathbf{102}_{16}$, the VRAM 103 comprises RAMs $\mathbf{103}_1$ to $\mathbf{103}_{16}$, and the VRAM 104 comprises RAMs $\mathbf{104}_1$ to $\mathbf{104}_{16}$. Each of the RAMs are assigned the same addresses, so that 16-bit data is readout from each of the VRAMs 101 to 104 by one access thereto. Video data each composed of four bits and representative of a color of a respective one of the pixels are stored by a CPU 111 through a read/write control circuit 105. The read/write control circuit 105 also periodically readouts the video data from the VRAMs 101 to 104 in synchronism with scanning of a CRT display unit 113. In this case, odd-numbered bits of each 16-bit data read from the VRAM 101 are supplied to a P/S converter 121*a* composed of an 8-bit shift register, and even-numbered bits thereof are supplied to a P/S converter 121*b* composed of an 8-bit shift register. As shown in FIG. 3, the odd-numbered bits $D_1$ to $D_{15}$ of the data read from the VRAM 101 are stored respectively into the first to eighth stages of the shift register of the P/S converter 121*a*, and the even-numbered bits $D_0$ to $D_{14}$ of the same data are stored respectively into the first to eighth stages of the shift register of the P/S converter 121*b*. Similarly, P/S converters 122*a*, 123*a* and 124*a* are supplied with odd-numbered bits of data read from the VRAMs 102, 103 and 104, respectively, and P/S converters 122*b*, 123*b* and 124*b* are supplied with even-numbered bits of data read from the VRAMs 102, 103 and 104, respectively.

Each of the P/S converters 121*a*, 121*b* to 124*a*, 124*b* is triggered by a leading edge of each pulse of a clock signal $\phi$ fed from the read/write control circuit 105 to output the bits of the loaded data one by one from the highest-order stage thereof. The period (time interval) of the clock signal $\phi$ is set to a value which is twice as long as the time period required to display one pixel on the CRT display unit 113 or one dot display period. The time period to display one pixel in this system is 15.7 nsec, and therefore the period of the clock signal $\phi$ is 31.4 nsec. It will be readily understood that the clock signal $\phi$ is synchronized with the scanning effected in the CRT display unit 113. The four bits outputted simultaneously from the P/S converters 121*a*, 122*a*, 123*a* and 124*a* form one video data and are supplied to an input terminal of a look-up table 125. Similarly, the four bits outputted simultaneously from the P/S converters 121*b*. 122*b*, 123*b* and 124*b* form one video data and are supplied to an input terminal of another look-up table 126. Each of the look-up tables 125 and 126 comprises a RAM for storing conversion data, and converts each of the 4-bit video data supplied thereto into color data of a predetermined number of bits in accordance with the conversion data. The conversion data in the look-up tables 125 and 126 can be changed by the CPU 11. Each color data outputted from each of the look-up tables 125 and 126 contains red, green and blue data representative respectively of red, green and blue components of the color of a respective one of the pixels. The color data from the look-up table 125 is supplied to an input terminal A of a two-to-one selector 127, and the color data from the look-up table 126 is supplied to another input terminal B of the selector 127. This selector 127 is so designed that the color data applied to the input terminal A thereof is outputted from an output terminal thereof when the clock signal $\phi$ applied to a selection terminal SEL thereof is in the "1" state, and that the color data applied to the input terminal B thereof is outputted from the output terminal thereof when the clock signal $\phi$ is in the "0" state. The color data thus outputted from the selector 127 is supplied to a DAC (digital-to-analog converter) 112. This DAC 112 converts the red, green and blue data contained in each of the color data fed from the selector 127 into analog red, green and blue signals R, G and B, respectively, and supplies these analog color signals R, G and B to the CRT display unit 113. In this image display system, the VRAMs 101 to 104, P/S converters 121 to 124, look-up tables 125 and 126 and selector 127 constitute the video data processing circuit 100.

The operation of the above-described video data processing circuit 100 will now be described with reference to FIG. 4 and a timing chart of FIG. 5.

Figure 4:
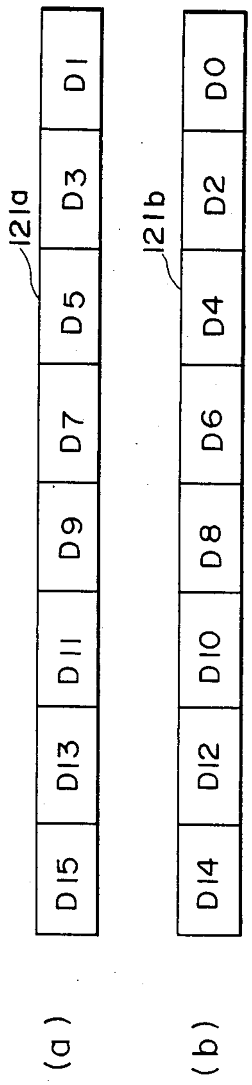
FIG. 4 is an illustration showing the data supplied to the P/S converters 121*a* and 121*b* of the video data processing circuit of FIG. 2.
Figure 5:
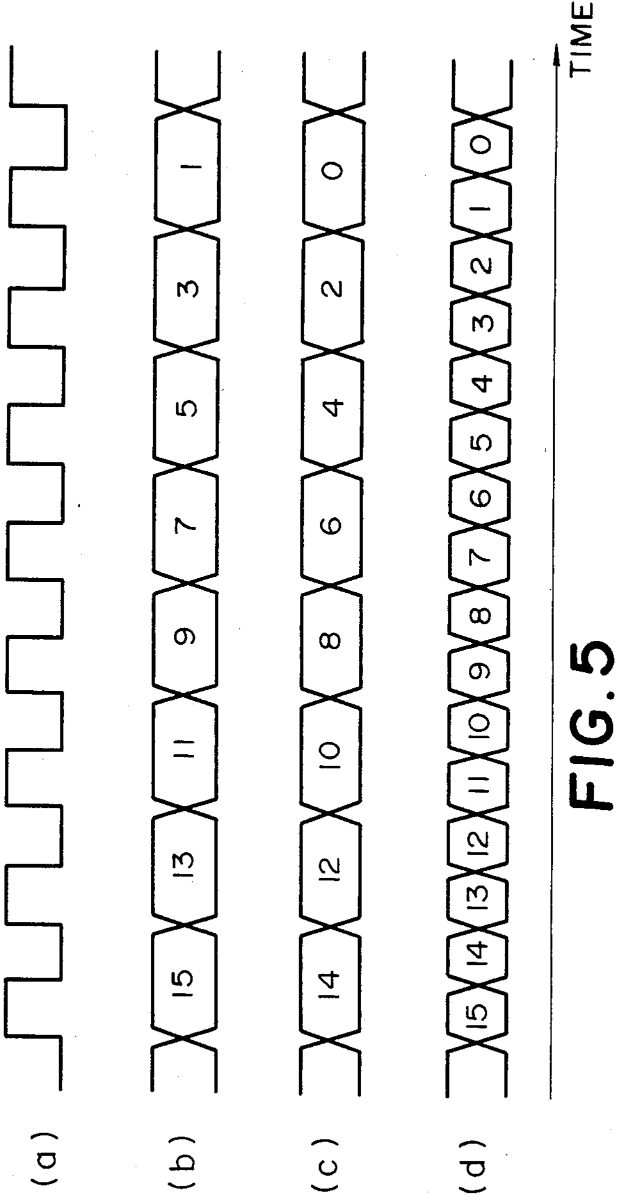
FIG. 5 is a timing chart of the clock signal $\phi$, the data outputted from the P/S converters 121*a* and 121*b* and the color data outputted from the selector 127.

FIGS. 4-(*a*) and 4-(*b*) show the data fed in parallel from the VRAM 1 to the P/S converters 121*a* and 121*b*, respectively. These data are serially outputted respectively from the P/S converters 121*a* and 121*b*, as shown in FIGS. 5-(*b*) and 5-(*c*). Thus, the 8-bit data loaded on each of the P/S converters 121*a* and 121*b* are outputted therefrom bit by bit from the highest-order bit thereof at the time interval of 31.4 nsec determined by the clock signal $\phi$ shown in FIG. 5-(*a*). This is true with the data loaded on the P/S converters 122*a*, 122*b* to 124*a*, 124*b*.

Thus, the look-up table 125 is first supplied with the highest-order bits $D_{15}$ of the four data read from the VRAMs 101 to 104, and is thereafter sequentially supplied with the bits $D_{13}$, the bits $D_{11}$, . . . and the bits $D_1$. On the other hand, the look-up table 126 is first supplied with the second highest-order bits $D_{14}$ of the four data read from the VRAMs 101 to 104, and is thereafter sequentially supplied with the bits $D_{12}$, the bits $D_{10}$, . . . and the bits $D_0$. In this case, the 4-bit data outputted from the P/S converters 121 to 124 are supplied to the look-up tables 125 and 126 at the time interval twice as long as the dot display period (15.7 nsec) of the CRT display unit 113, so that the color data are also outputted respectively from the look-up tables 125 and 126 at the time interval twice as long as the dot display period of the CRT display unit 113. The selector 127 outputs the color data supplied to the input terminal A thereof when the clock signal $\phi$ is in the "1" state, and outputs the color data supplied to the input terminal B thereof when the clock signal $\phi$ is in the "0" state. Therefore, the selector 127 first outputs the color data corresponding to the highest-order bits $D_{15}$ of the four data read from the VRAMs 101 to 104, and thereafter sequentially outputs the color data corresponding to the bits $D_{14}$, the color data corresponding to the bits $D_{13}$, the color data corresponding to the bits $D_{12}$, . . . and the color data corresponding to the bits $D_0$. In this case, as shown in FIG. 5-(*d*), these color data are outputted from the selector 127 at a time interval half of the period of the clock signal $\phi$, that is, at a time interval equal to the dot display period of the CRT display unit 113. Thus, the color data are outputted from the selector 127 in synchronism with the display of pixels on the CRT display unit 113.

Each of the color data thus outputted from the selector 127 is converted by the DAC 112 into the analog red, green and blue signals and thence supplied to the CRT display unit 113, whereby a color image is display on the screen of the CRT display unit 113.

In the above-described embodiment, although only two P/S converters are provided for each of the VRAMs 101 to 104, more than two P/S converters may be provided for each VRAM. In this case, however, the number of look-up tables must also be increased in accordance with that of the P/S converters. For example, if j sets of P/S converters are provided for each of the VRAMs 101 to 104, j sets of look-up tables must be provided. In this case, the selector 127 must be modified so as to sequentially output the color data fed from these look-up tables at a time interval which is one jth of the period of the clock signal $\phi$, and such a modification is within the skill of one of ordinary skill in the art. With the arrangement of the aforesaid embodiment, resolution of 1024×800 can be realized. With the arrangement according to the present invention, it is also possible to enhance the resolution of image to more than 1024×800 without the operation speed of the P/S converters and look-up tables being increased. Although only four VRAMs are provided in the aforesaid embodiment, the number of VRAMs may be increased in accordance with the maximum number of colors simultaneously used in the color display of image.

What is claimed is:

1. A video data processing circuit for use with an image display unit for displaying an image on a display area of the image display unit in accordance with video data which are respectively representative of pixels constituting the display area comprising:

first to ith memory means having the same addresses for storing the video data and for being simultaneously accessed to output at a time i pieces of data from among the stored video data;

first to jth parallel-to-serial converting means provided correspondingly to said first to ith memory means, each of said first to jth parallel-to-serial converting means for storing corresponding ones from among said i pieces of data and then for serially outputting said corresponding ones at a first predetermined interval;

first to jth look-up table means provided correspondingly to said first to jth parallel-to-serial converting means, the kth (1≦k≦j) look-up table means being responsive to said corresponding ones outputted from the kth parallel-to-serial converting means and successively converting the received ones into image data; and selector means for being supplied with said image data respectively from said first to jth look-up table means and outputting the supplied image data one by one at a second predetermined time interval of which length is equal to one jth of that of said first predetermined time interval, the image being displayed on the image display unit in accordance with said image data outputted from said selector means.

2. A video data processing circuit according to claim 1, wherein each of said video data is composed of a plurality of bits, and each of said first to ith memory means comprises a plurality of memories corresponding to said plurality of bits respectively and having the same addresses and are simultaneously accessed to output at a time the plurality of bits of each of said i pieces of data.

3. A video data processing circuit according to claim 1, wherein each of said parallel-to-serial converting means comprises a shift register having at least i/j stages which is triggered to effect a shift operation at said first predetermined interval.

4. A video data processing circuit according to claim 1, wherein the image display unit is a CRT display unit and wherein said second predetermined time interval is equal in time length to a time interval at which the pixels are displayed on the CRT display unit.

5. A video data processing circuit according to claim 4, wherein said video data are data representative of colors of said pixels to be displayed on the CRT display unit.

6. A video data processing circuit according to claim 5, wherein said color data is data representative of red, green and blue color components.

7. A video data processing circuit for use with an image display unit for displaying an image on a display area of the image display unit in accordance with plural video data which are respectively representative of pixels constituting the display area, comprising:

a first number of memory means, each addressable by the same addresses, for storing the video data and for being simultaneously accessed to output at a time multiple pieces of data equal to said first number from among the stored video data;

a second number of parallel-to-serial converting means provided correspondingly to said first number of memory means, the second number being an integral fraction of the first number, each of said second number of parallel-to-serial converting means being coupled for storing corresponding ones from among said multiple pieces of data and then for serially outputting said corresponding ones at a first predetermined rate;

a plurality of look-up table means provided in a number equal to said second number, each look-up table means being responsive to said corresponding ones outputted from a corresponding one of the parallel-to-serial converting means and successively converting the received ones into image data; and selector means for being supplied with said image data respectively from said plurality of look-up table means and outputting the supplied image data one by one at a second predetermined rate which is greater than said first predetermined rate, the image being displayed on the image display unit in accordance with said image data outputted from said selector means.

8. A video data processing circuit, comprising:

a plurality of video memory means, each for storing video data formed of plural groups, wherein each group is comprised of a predetermined number of bits of data;

a plurality of sets of parallel-to-serial converters, one set provided separately for each of said memory means, each set of converters receiving a group of bits in parallel from an associated memory means, wherein each set includes at least a first converter which receives a first subset of the respective group and a second converter which receives a second subset of the respective group, each converter providing a serial output at a first rate, wherein the output of each converter in a set is combined in parallel with the output of a corresponding converter in every other set to form a plurality of multi-bit signals in which the number of bits is equal to the number of sets;

a plurality of look-up table means, equal in number to the number of converters in a set and each receiving a different one of said multi-bit signals, for successively converting the received multi-bit signals into image data; and selector means supplied in parallel with the image data from each lookup table means and outputting said data one by one at a second rate equal to the first rate divided by the number of converters per set.

* * * * *